W. DERRENBACHER.
METHOD AND MEANS FOR PACKING CANDY.
APPLICATION FILED MAR. 30, 1920.
1,361,312.
Patented Dec. 7, 1920.
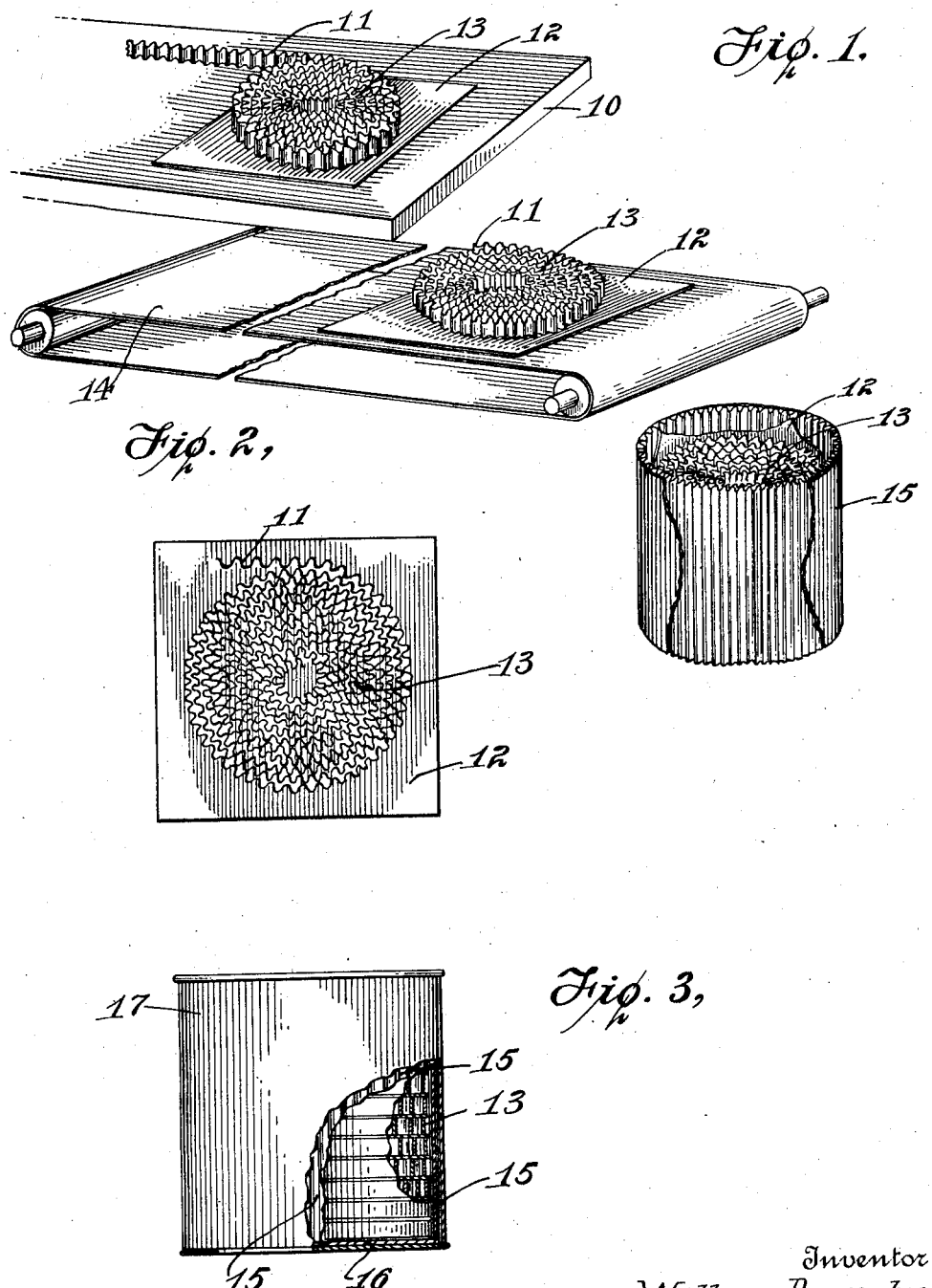

UNITED STATES PATENT OFFICE.

WILLIAM DERRENBACHER, OF NEW YORK, N. Y.

METHOD AND MEANS FOR PACKING CANDY.

1,361,312.  Specification of Letters Patent.  Patented Dec. 7, 1920.

Application filed March 30, 1920. Serial No. 369,948.

*To all whom it may concern:*

Be it known that I, WILLIAM DERRENBACHER, a citizen of the United States, and a resident of New York city, in the county of Kings and State of New York, have invented certain new and useful Improvements in Methods and Means for Packing Candy, of which the following is a specification.

My invention relates to packaging, and especially to a package for and method of packaging hard candy and similar articles.

A great many varieties of hard candy are manufactured by standard machines which deliver the candy in the form of a continuous strip having any one of a great variety of forms. This method of manufacture, and the nature of the candy, are favorable to production in large quantities, especially as such candy is sold at a relatively low price. However, an obstacle to such production has been the lack of a suitable package and method of packing the many comparatively fragile types of hard candy in such a way that they may withstand long shipments. Consequently, the local demand for such candy, though ordinarily far below the practicable output of a factory, provides the limit of production, since such candy cannot be shipped to a distance by ordinary methods of packing.

Furthermore, candy of this type is generally sold in bulk, the strips being ordinarily broken into relatively short pieces for sale to the consumer; and consequently it is necessary to ship such candy in bulk, the use of small packages entailing a prohibitive expense for this type of candy.

Heretofore, the method of shipping in bulk hard candy manufactured in strip form has been to break such strips into pieces, which are piled up indiscriminately in suitable containers. While this arrangement is practical for the heavier type of candy, it is wholly unsuited to the many relatively fragile forms, such as ribbon candy, since the jarring and shocks incident to transportation rapidly break up the pieces into fragments too small to be salable. Consequently, it has heretofore been considered impracticable to ship candy of this type for any considerable distance, and the output of these fragile types has necessarily been limited to local demands.

A primary object of my invention is to overcome this difficulty by packing hard candy so that it will withstand long shipments and comparatively rough usage without damage.

A further object is to package hard candy of the strip type in such a way that the continuous output of a machine may be rapidly and easily prepared for packing. I also have provided an arrangement whereby candy of this type may be packed compactly and without waste of space, while protecting the candy against breakage.

My invention, furthermore, includes the arrangement of such candy in units, preferably before the candy is entirely hard, so that it will readily conform to the container, assuring tight and economical packing.

Another object of my invention is to provide a holder for the packed candy adapted to be inserted in a standard container after such holder has been properly filled. Such holder is also advantageous when metal containers are employed, as the walls of the latter chill the outer layers of candy, hardening them and thus preventing their accommodation to the exact form of the container. In the specific form shown, I have so constructed and arranged the holder that it provides an additional protection against the shocks of handling.

My invention also includes a package for candy of this type which is so constructed and arranged that it may be subjected to the shocks of transportation without damage to the candy. Specifically, my package includes a container filled with strip candy in a series of superposed layers with cushioning means therebetween and preferably with protecting means between the candy and the walls of the container.

Other objects and advantages of my construction will be apparent from the following description, taken in connection with the accompanying drawings, in which:

Figure 1 is a diagrammatic perspective view indicating the method of packing,

Fig. 2 is a plan view of a unit, and

Fig. 3 is a side elevation of a packed container, parts being broken away to show the contents.

While my invention is applicable to various forms of candy and other materials, and is not necessarily limited to those in the form of strips, it is particularly adapted for use with candy which comes from the machine in the form of a strip, the drawings illustrating one form of this candy which consists of a transversely fluted ribbon. For convenience, I will first describe the method of packaging, though my invention comprises both the method and the package which is produced.

A table 10 is located adjacent the candy-making machine, and the operator guides the strip 11, which is warm and soft, into position upon a carrier sheet 12 which may consist of oiled or waxed paper or other suitable material. The strip 11 may be arranged upon sheet 12 in any desired way, preferably with successive stretches of the strip in juxtaposition, so that no space is wasted, the operator building up a disk 13 of candy having a contour approximately equal in size and shape to that of the container. In the form disclosed, I have shown a round container and a spiral arrangement of the candy; but it will be apparent that both the container shape and the exact arrangement of the strip in disk 13 may be varied as desired. When the disk 13 has reached the desired size and shape, strip 11 is broken, a plan view of the sheet 12 and disk 13 at this stage being shown in Fig. 2. The sheet 12 is then removed from the table 10, one suitable arrangement being to provide a conveyer such as a belt 14 adjacent to table 10, onto which sheet 12 and the disk 13 may be slid. The operator then places another sheet 12 in position on table 10 and repeats the operation.

Meanwhile, the sheet and disk are carried to another operator, who packs the disk in a suitable container. This is readily done by grasping the corners of sheet 12, and lowering the disk into the container, the corners of said sheet turning upward and lying against the sides of the container, affording a substantial measure of lateral protection for the candy, while the sheets between disks serve as cushioning means, and preserve the contour of the candy, likewise preventing broken parts from scattering across the contents of the container. While the candy has become sufficiently hard by this time to pack readily, the packing should be so timed that the candy is still sufficiently soft to conform to the contour of the container under the pressure incident to the packing of each disk 13 therein, thus insuring a tight, smooth fit without substantial breakage.

While the candy may be packed either from table 10 or conveyer 14 directly into the container, I prefer to provide an intermediate holder 15 into which the successive disks 13 are packed, the holder 15 and the disks therein being placed bodily in the container. Any desired material may be employed for holder 15, though I prefer to employ the usual corrugated pasteboard, thus providing a very substantial additional protection against lateral shocks. The holder 15, if desired, may be provided with a bottom 16 (Fig. 3) which may also be of corrugated paper, and a similar disk may be placed over the candy before covering the container. One advantage of the employment of holder 15 is that it eliminates the chilling and breaking of the outer parts of each disk 13 when such disks are placed directly against metal walls. Furthermore, when the candy is in spiral form, the formation of each disk is changed more gently to that of the required container by this method, as the holder 15 is preferably somewhat flexible. Furthermore, this construction prevents dents and other minor inequalities in the surface of a metal container from seriously damaging the candy therebeneath.

While I have disclosed in Fig. 3 a cylindrical metal container 17, it will readily be understood that my invention is not limited thereto, as the arrangement is such that tapering containers, such as pails, and convex containers, such as barrels, and other forms may be packed readily without waste of space, since I prefer to present each disk 13 at the container while it is still relatively flexible, permitting the packer to bend the disk for insertion within the top of a barrel, for instance, or to otherwise manipulate each disk in accordance with the space it is to fill.

While I have described my method and package as particularly adapted to candy, it will be apparent that the same arangement may be employed in connection with other materials of similar properties. Furthermore, it will be available for various types of candy which are not produced in strip form.

While I prefer to pack the candy while warm and flexible, my invention also includes packing it when hard.

I claim:

1. The method of packing hard candy in strip form which includes arranging the candy on a carrier sheet and placing the sheet and candy in a holder adapted to fit within a container.

2. The method of packing hard candy in strip form which includes arranging the candy on a plurality of carrier sheets and placing the sheets in superposed position in a holder adapted to fit within a container.

3. The method of packing hard candy in strip form which includes arranging a continuous strip on a carrier sheet with successive reaches of the strip in juxtaposition, and placing the sheet and strip in a holder adapted to fit within a container.

4. The method of packing hard candy in strip form which includes arranging a continuous strip on a carrier sheet with successive reaches in juxtaposition to form a disk approximating the shape of a holder adapted to fit within a container, and then placing the sheet and strip within the holder.

5. The method of packing hard candy in strip form which includes arranging the candy while soft on a carrier sheet to form a disk approximating the contour of a holder adapted to fit within a container, and placing the sheet and disk within the holder while the candy is still sufficiently plastic to conform to the contour of the holder.

6. The method of packing hard candy in strip form which includes arranging a length of the strip upon each of a plurality of carrier sheets and placing said sheets with the candy thereon in superposed position in a holder adapted to fit within a container, said candy being placed in the holder while soft, to permit it to conform readily to the shape of said holder and container.

7. The method of packing hard candy in strip form for shipment in a container which consists in winding a continuous strip while soft on a carrier sheet into the form of a disk approximating the shape of the container, and placing the carrier sheet and disk in the container.

8. The method of packing hard candy in strip form for shipment in a container which consists in winding a continuous strip while soft on a carrier sheet into the form of a disk approximating the shape of the container, placing the carrier sheet and disk in a holder, and placing the holder in the container.

9. The method of packing hard candy in strip form for shipment in a container, which consists in winding a continuous strip while soft on successive carrier sheets into the form of disks approximating the shape of the container, placing the carrier sheets and disks successively in a holder, and placing the holder in the container.

10. The method of packing hard candy in strip form for shipment in a container which consists in coiling a continuous strip while soft on a carrier sheet into the form of a disk approximating the shape of the container, and placing the carrier sheet and disk in the container.

11. The method of packing hard candy in strip form for shipment in a container which consists in winding a continuous strip while soft on a carrier sheet of greater area than the cross-sectional area of the container into the form of a disk approximating the shape of the container, turning up the edges of the carrier sheet around the sides of the disk, and placing the carrier sheet and disk in the container.

12. The method of packing hard candy in strip form for shipment in a container which consists in coiling a continuous strip while soft on a rectangular carrier sheet into the form of a circular disk, turning up the corners of the carrier sheet around the sides of the disk, and placing the carrier sheet and disk in the container.

13. A package for hard candy including an outer container, a holder of corrugated pasteboard adapted to fit snugly within the container, a plurality of layers of said candy arranged in superposed position within said holder, and sheets of cushioning material located between each pair of adjacent layers and provided with marginal extensions located between the periphery of each layer and the inside of the holder.

14. A package for hard candy including a container of circular cross-sectional form, a plurality of layers of candy arranged in superposed position within the container, and rectangular sheets of cushioning material located between layers and having their corners up-turned to cushion the sides of the layers.

Signed at New York city, in the county of Kings and State of New York this 2nd day of February, A. D. 1920.

WILLIAM DERRENBACHER.